Nov. 15, 1966    D. A. McLEAN    3,286,136
FABRICATION OF ELECTRODES FROM MODULAR UNITS
Filed Sept. 20, 1963    2 Sheets-Sheet 1

INVENTOR
D. A. McLEAN
BY Edward M. Fink
ATTORNEY

United States Patent Office 3,286,136
Patented Nov. 15, 1966

3,286,136
FABRICATION OF ELECTRODES FROM MODULAR UNITS
David A. McLean, Chatham, N.J., assignor to Bell Telephone Laboratories, Incorporated, New York, N.Y., a corporation of New York
Filed Sept. 20, 1963, Ser. No. 310,267
8 Claims. (Cl. 317—230)

This invention relates to a technique for the fabrication of tantalum electrolytic capacitors utilizing a tantalum body as one of the electrodes, an oxide layer of the tantalum produced by anodization as the dielectric and electrically conductive counter-electrode, and to the capacitors so produced.

Tantalum electrode elements destined for use in devices of the described type are generally sintered porous masses of cylindrical form in which the length ranges from two to four times the diameter and the volume is adjusted as desired to yield the requisite capacitance and voltage rating.

In brief, a typical procedure for fabricating such structures involves pressing tantalum powder together with a small amount, of the order of 1 to 2 percent by weight, of a finely divided metal oxide and a small amount, of the order of 1 percent by weight, of a binder, such as a polyethylene glycol compound, which are selected to facilitate pressing and to enter into chemical reaction with the impurities present. The resultant pressed pellets are next inserted into a furnace and heated at subatmospheric pressures at temperatures of the order of 2000° C. for approximately one hour. After cooling, the sintered pellets are employed as anodes in capacitors fabricated in accordance with conventional techniques.

Unfortunately, such techniques have not been completely free from defects, the major difficulty encountered being inadaquate purification during sintering, particularly with electrodes having a high capacitance voltage product. It has been determined that during the sintering process a large fraction of the more volatile materails evaporate from the tantalum, partially as elemental materials and partially as volatile oxides, carbon reacting with oxygen and being liberated as carbon monoxide. The net result is that normal capacitor grade tantalum after sintering has less than 10 percent of the impurities originally present, but enough to adversely affect leakage current, stability of characteristics during life test and voltage rating capability. Additionally, the effectiveness of the purification process is directly related to the diffusion path length within the body of the material, thereby accounting for the relatively poor performance of certain capacitors.

A further disadvantage commonly observed in large electrodes of the type discussed above lies in the undesirably high dissipation factors and poor frequency characteristics which are caused by the lengthening of electrical conduction paths to the interior and high series resistances.

In accordance with the present invention, these and other attendant difficulties are avoided by the fabrication of electrodes destined for use in electrolytic capacitors from a plurality of partially sintered modules which are basically flat in form, the resultant elements evidencing improved reliability and high frequency characteristics.

The inventive technique involves pressing tantalum powder into a flat sheet, hereinafter termed module, which is subsequently subjected to a partial sintering treatment in vacuum at elevated temperatures in order to obtain a satisfactory mechanical bond. A plurality of modules so obtained is then stored for subsequent assembly in groups of $n$ into any one of a number of anodes to yield capacitors having a capacitance rating $n$ times that of a single module. Anode assembly is accomplished by stacking the modules, pressing and sintering in vacuum at elevated temperatures.

The invention will be more fully understood from the following detailed description taken in conjunction with the accompanying drawing, wherein.

An exemplary technique in accordance with the invention involves pressing a weighed sample of tantalum powder, obtained from commercial sources, on a conventional hydraulic press into an I shape having a thin area within the range of 15–75 mils thick and a thick section at the end extending 10–30 mils. Typically, the broad face is 100–500 mils square. The degree of pressure applied during the compacting step may vary according to the apparent density desired, but usually averages approximately 16 tons per square inch.

Tantalum powders commonly employed for such purposes are generally produced from the ore by one of numerous reduction processes, broadly classified as electrolytic and chemical reduction. Accordingly, the powders so obtained often contain a wide range of impurities which tend to have an adverse effect upon capacitor properties. Metal contaminants such as nickel, iron, copper, chromium, et cetera, are generally removed during the sintering operation; however, nonmetals such as carbon are not generally removed under the ordinary processing conditions in the absence of oxygen. Accordingly, it is sometimes desirable to add a volatile metal oxide in an amount on the order of 0.5 percent by weight to the tantalum powder prior to pressing.

It has also been found desirable to add from 1 to 2 percent by weight of an organic compound to the tantalum powder prior to pressing to act as a binder or lubricant. This is typically accomplished by dissolving the compound in a volatile solvent, mixing and evaporating the solvent while agitating the powder.

Figure 1:
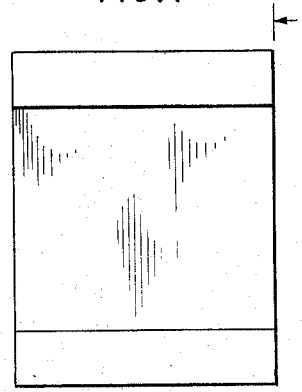
FIG. 1 is a plan view of a module fabricated in accordance with the present invention.
Figure 2:
FIG. 2 is a side view of the module shown in FIG. 1.

The pressed module, which is shown in plan view in FIG. 1 and side view in FIG. 2 is then set aside. The described procedure is then repeated $n$ times so that the number of modules will be sufficient to produce the desired anode.

In order to provide the necessary mechanical and electrical contact to the desired anode, an axial lead wire is introduced at the time of pressing of one of the modules, the lead wire extending approximately one half the length of the module.

The pressed modules are then racked on suitable trays and inserted into a conventional resistance heated furnace, typically having a tantalum heater and tantalum heat shields. After evacuation of the furnace, the temperature as measured at a representative module location is elevated to a value within the range of 1800–2000° C. and maintained for a period of time sufficient to assure satisfactory mechanical bonding, typically 30 minutes. This sintering step hereinafter referred to as presintering, may be partial sintering as described, or may be total sintering, as desired. Next, the furnace is permitted to cool under vacuum to below 200° C. and the modules removed.

Figure 3:
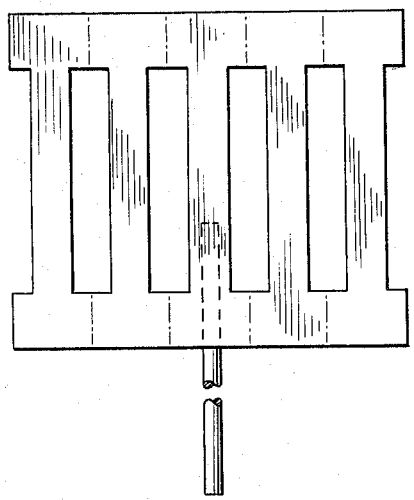
FIG. 3 is a side view of an anode fabricated in accordance with the present invention.

The presintered modules are now ready for assembly and are stacked and pressed on a conventional hydraulic press at pressures of approximately 16 tons per square inch. The resultant assembly is shown in FIG. 3.

The pressed assembly is then inserted into the resistance heated furnace and subjected to sintering at a temperature within the range of 1900–2200° C. for one hour in vacuum.

Figure 4:
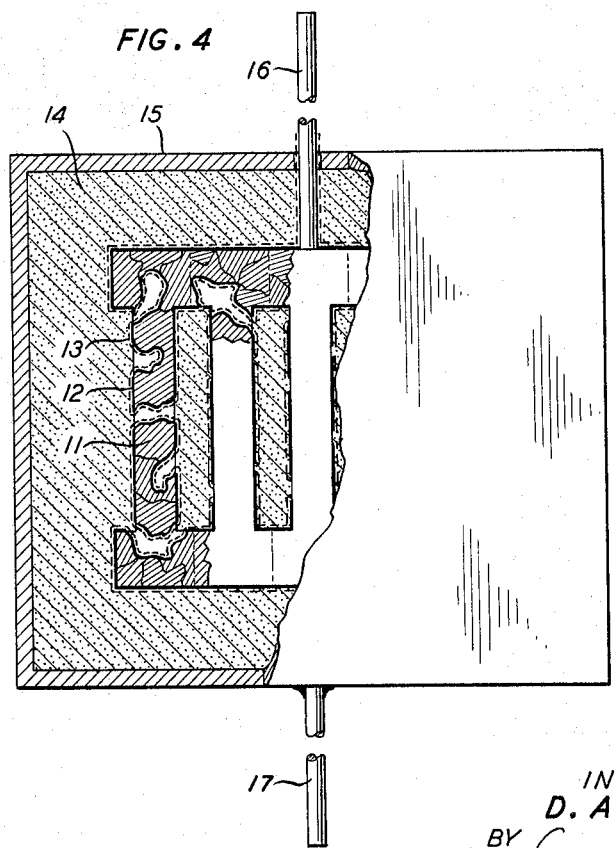
FIG. 4 is a front elevational view, partly in section, of a solid tantalum electrolytic capacitor including an anode of the present invention.

With further reference now to FIG. 4, there is shown, partly in section, a solid electrolytic capacitor using an anode formed in accordance with the present invention. Shown in the figure is anode 11 obtained as described above. In intimate contact with anode 11 is oxide film 12 produced by anodization. Covering oxide film 12 is a layer of manganese dioxide 13 produced by pyrolysis of an aqueous solution of manganous nitrate. Graphite layer 14 and solder shell 15 complete the capacitor. Electrode 16 is an integral part of anode 11 having been fabricated as above described. Electrode 17 is attached to shell 15 typically by schooping.

Figure 5:
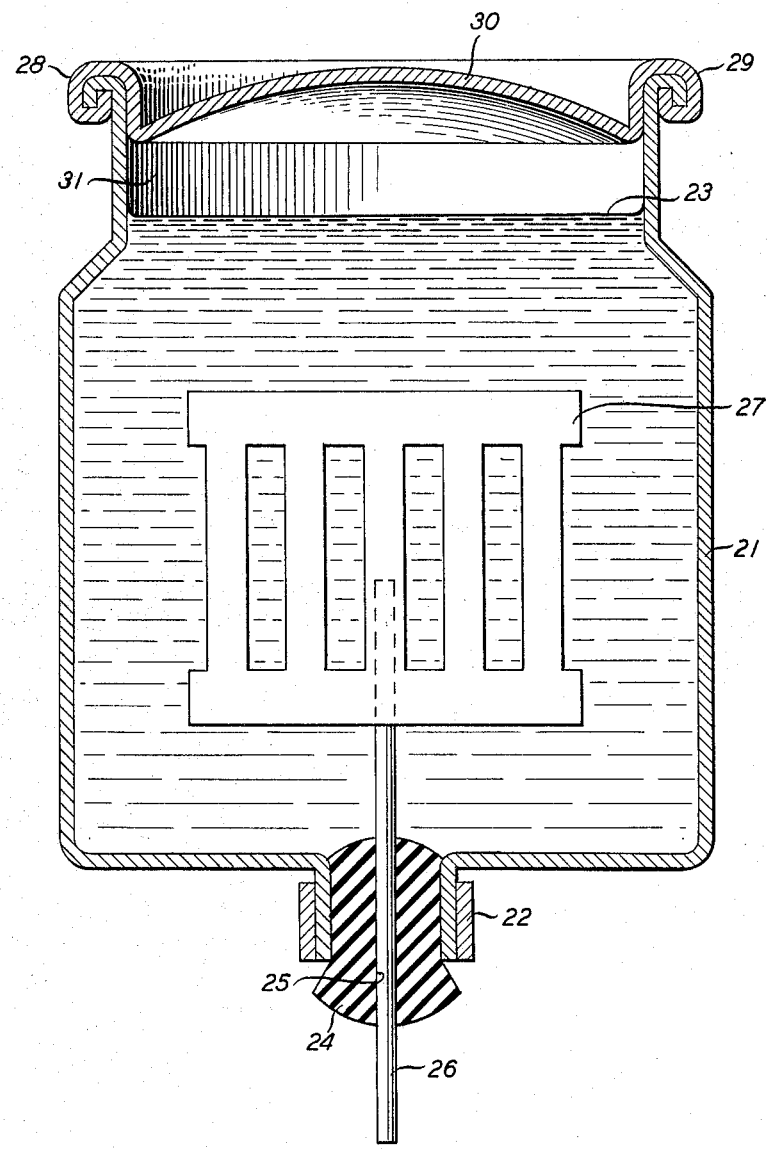
FIG. 5 is a cross-sectional view of a wet tantalum electrolytic capacitor including an anode of the present invention.

An electrolytic capacitor of the so called wet type using an anode formed in accordance with the present invention is shown in FIG. 5.

The container 21 is preferably of metal and constitutes the cathode of the capacitor, and is provided with a reduced tubular extension 22. A liquid electrolyte 23, for example, an aqueous solution of a weak acid such as boric acid, phosphoric acid, citric acid, et cetera, is provided in container 21. A seal provided in the extension 22 may consist of a plug 24 of rubber or other resilient material through the central bore 25, of which protrudes an extension 26 of the anode 27. The extension 22 is crimped around the rubber plug to form a liquid and gas tight seal therewith. Anode 27 comprises a plurality of modules fabricated in accordance with the present inventive technique. At its free end the container 21 is provided with a rim 28 around which is spun the edge 29 of the cap 30 with the interposition of a gasket vent 31 of a material sufficiently porous to permit the escape of gasses liberated in operation.

The above capacitor structures are given merely as illustrations, and it will be appreciated that the electrodes fabricated in accordance with the present inventive technique may be employed in any suitable capacitor structure either wet or dry.

For illustrative purposes, the present invention is described below in terms of the fabrication of a solid electrolytic capacitor constructed of 5 modules. However, it is to be appreciated that the present invention is applicable to the manufacture of porous tantalum anodes regardless of the capacitor configuration.

EXAMPLE

Five one gram samples of electrolytically reduced tantalum powder are mixed with .01 gram of tantalum pentoxide and .01 gram of polyethylene glycol in toluene. Each of the resultant mixtures is stirred until the glycol solvent is completely evaporated.

Each of the five samples is then individually pressed into I shaped forms on a double action commercial hydraulic press under an applied pressure of 16 tons per square inch, an axial lead wire of 25 mil diameter tantalum wire being introduced at the time of pressing into one sample and extending approximately half the length of the pressed element.

Each of the resultant pressed modules is then racked on a tantalum tray and inserted in a resistance heated furnace having a tantalum heater and tantalum heat shields. After evacuation of the furnace the temperature is elevated to 2000° C. and maintained for 30 minutes. The power is then turned off and the furnace permitted to cool under vacuum to a temperature less than 200° C. prior to removal of the modules.

Next, the five modules are stacked with the module bearing the axial lead intermediate, and inserted in the press and subjected to a pressure of 16 tons per square inch. The resultant assembly is then inserted in the resistance heated furnace and heated in vacuum at 2100° C. for 60 minutes. After cooling to 200° C. under vacuum, the resultant anode is removed.

The next step comprises anodizing the anode in an electrolytic cell in which the pressed modules are made the anode and a tantalum sheet is used as the cathode. The electrolyte employed is an aqueous solution of 0.4 percent of nitric acid. Following, an anodizing voltage of 100 volts D.-C. is applied and maintained for 3 hours. The anodized body is then coated with a layer of manganese dioxide by immersion in an aqueous solution containing in excess of 50 percent by weight of manganous nitrate, and heated in air to a temperature of 350° C. for one minute. Following the pyrolysis step, the anode is reanodized at 100 volts D.-C. for 30 minutes at a current density of 0.035 milliampere in an 80 percent acetic acid electrolyte. The capacitor is completed by coating the manganese dioxide with an aqueous slurry of graphite, drying the graphite coating and applying a solderable coating over the graphite.

While the invention has been described in detail in the foregoing description and drawing, the aforesaid is by way of illustration only and is not restrictive in character. It will be understood by those skilled in the art that the methods described herein are applicable to metals other than tantalum, for example, niobium, and to the fabrication of capacitors of any configuration. The several modifications which will readily suggest themselves to persons skilled in the art, are all considered within the broad scope of this invention, reference being had to the appended claims.

What is claimed is:

1. A method for the fabrication of an electrode for use in an electrolytic capacitor which comprises the steps of pressing a film-forming metal powder into a plurality of flat I shaped porous modules, the ends of said modules being of greater thickness than the central portions thereof, partially sintering each of said modules into self-supporting structures by heating, placing a plurality of said structures one directly atop another and pressing the ends thereof to form a porous unitary supporting assembly and sintering said assembly by heating, so producing a porous film-forming electrode.

2. A method in accordance with the procedure of claim 1 wherein said film-forming metal is tantalum.

3. A method in accordance with the procedure of claim 1 wherein said partial sintering is conducted in vacuum at temperatures within the range of 1800–2000° C. for at least 30 minutes.

4. A method in accordance with the procedure of claim 1 wherein said sintering is conducted at temperatures within the range of 1800–2000° C. in vacuum for at least one hour.

5. A method for fabricating a solid electrolytic capacitor which comprises the steps of pressing a film-forming metal powder into a plurality of flat I shaped porous modules, the ends of said modules being of greater thickness than the central portions thereof, partially sintering each of said modules into self-supporting structures by heating, placing a plurality of said structures one directly atop another and pressing the ends thereof to form a porous unitary supporting assembly and sintering said assembly by heating, so producing a porous film-forming electrode, anodizing said electrode, coating said anodized electrode with a semiconductive electrolyte layer and depositing a counter electrode upon and in intimate contact with said semiconductive electrolyte layer.

6. A method in accordance with claim 5 wherein said film-forming metal is tantalum.

7. A solid electrolytic capacitor including an electrode comprising a porous unitary supporting assembly containing a plurality of pressed porous sintered modules of I shape having a cavity between the central portions thereof, the ends of said assembly being of greater thickness than the central portion thereof, an anodized layer of said electrode, a semiconductive electrolyte layer upon said anodized layer and a counter electrode.

8. A wet electrolytic capacitor including an electrolyte, a cathode and an anode, said anode comprising a plurality of pressed porous sintered modules of I shape having a cavity between the central portions thereof, the ends of said anode being of greater thickness than the central portions thereof.

No references cited.

JOHN W. HUCKERT, *Primary Examiner.*

J. D. KALLAM, *Assistant Examiner.*